United States Patent [19]

Kalnoki-kis

[11] 4,278,741

[45] Jul. 14, 1981

[54] NONAQUEOUS CELL

[75] Inventor: Tibor Kalnoki-kis, Westlake, Ohio

[73] Assignee: Union Carbide Corporation, New York, N.Y.

[21] Appl. No.: 151,993

[22] Filed: May 30, 1980

Related U.S. Application Data

[63] Continuation-in-part of Ser. No. 147,132, May 6, 1980, abandoned, which is a continuation-in-part of Ser. No. 52,463, Jun. 27, 1979, abandoned.

[51] Int. Cl.³ .............................................. H01M 6/00
[52] U.S. Cl. ..................................... 429/48; 429/105; 429/196
[58] Field of Search ................. 429/48, 105, 194, 196, 429/197

[56] References Cited

U.S. PATENT DOCUMENTS

| | | | |
|---|---|---|---|
| Re. 22,065 | 4/1942 | Young | 136/111 |
| 3,098,770 | 7/1963 | Horowitz et al. | 136/100 |
| 3,438,912 | 4/1969 | Tsukamoto et al. | 260/2.5 |
| 3,573,106 | 3/1971 | Johnson et al. | 136/131 |
| 3,836,403 | 9/1974 | Gaines | 136/83 R |
| 3,864,168 | 2/1975 | Casey, Jr. et al. | 136/6 LN |
| 3,891,457 | 6/1975 | Auborn | 136/6 LN |
| 3,993,501 | 11/1976 | Kalnoki-kis | 429/48 |

FOREIGN PATENT DOCUMENTS 848855 9/1960 United Kingdom .
1376423 12/1974 United Kingdom .

*Primary Examiner*—Charles F. LeFevour
*Attorney, Agent, or Firm*—Cornelius F. O'Brien

[57] ABSTRACT

A nonaqueous cell comprising a liquid cathode-electrolyte an active metal anode, such as lithium, a cathode collector, such as carbon, and a separator disposed between said anode and said cathode collector and wherein the surface of the separator facing the anode is coated with a vinyl polymer film.

14 Claims, No Drawings

NONAQUEOUS CELL

This application is a continuation-in-part application of Ser. No. 147,132 filed May 6, 1980 which, in turn, is a continuation-in-part application of Ser. No. 052,463 filed June 27, 1979 both now abandoned.

FIELD OF THE INVENTION

The invention relates to a nonaqueous cell employing an active metal anode, a cathode collector, a separator disposed between and separating the cathode collector from the anode, an active liquid cathode-electrolyte and wherein the surface of the separator facing the anode is coated with a vinyl polymer film.

BACKGROUND OF THE INVENTION

The development of high energy battery systems requires, among other things, the compatibility of an electrolyte possessing desirable electrochemical properties with highly reactive anode materials, such as lithium or the like. The use of aqueous electrolytes is precluded in these systems since the anode materials are sufficiently active to react with water chemically. It has, therefore, been necessary in order to realize the high energy density obtainable through use of these highly reactive anodes to turn to the investigation of nonaqueous electrolyte systems.

The term "nonaqueous electrolyte" as used herein refers to an electrolyte which is composed of a solute, such as, for example, a metal salt or a complex salt of Group IA, Group IIA, Group IIIA or Group VA elements of the Periodic Table, dissolved in an appropriate nonaqueous solvent. The term "Periodic Table" as used herein refers to the Periodic Table of Elements as set forth on the inside back cover of the Handbook of Chemistry and Physics, 48th Edition, The Chemical Rubber Co., Cleveland, Ohio, 1967-1968.

A multitude of solutes is known and many have been suggested for use but the selection of a suitable solvent has been particularly troublesome. The ideal battery electrolyte would comprise a solvent-solute pair which has a long liquid range, high ionic conductivity and stability. A long liquid range, i.e., high boiling point and low freezing point, is essential if the battery is to operate at other than normal ambient temperatures. High ionic conductivity is necessary if the battery is to have high rate capability. Stability is necessary with the electrode materials, the materials of cell construction, and the products of the cell reaction to provide long shelf life when used in a primary or secondary battery system.

It has recently been disclosed in the literature that certain materials are capable of acting both as an electrolyte carrier, i.e., as solvent for the electrolyte salt, and as the active cathode for a nonaqueous electrochemical cell. U.S. Pat. Nos. 3,475,226, 3,567,515 and 3,578,500 each disclose that liquid sulfur dioxide or solutions of sulfur dioxide and a co-solvent will perform this dual function in nonaqueous electrochemical cells. While these solutions perform their dual function, they are not without several disadvantages in use. Sulfur dioxide is always present and being a gas at ordinary temperatures, it must be contained in the cell as a liquid under pressure or dissolved in a liquid solvent. Handling and packaging problems are created if the sulfur dioxide is used alone, and an additional component and assembly step is necessary if sulfur dioxide is to be dissolved in a liquid solvent. As stated above, a long liquid range encompassing normal ambient temperatures is a desirable characteristic in an electrolyte solvent. Obviously, sulfur dioxide is deficient in this respect at atmospheric pressure.

U.S. application Ser. No. 439,521 by G. E. Blomgren et al, filed Feb. 4, 1974, discloses a nonaqueous electrochemical cell comprising an anode, a cathode collector and a cathode-electrolyte, said cathode-electrolyte comprising a solution of an ionically conductive solute dissolved in an active cathode (depolarizer) wherein said active cathode (depolarizer) consists of a liquid oxyhalide or an element or Group V or Group VI of the Periodic Table. Although oxyhalides can be used effectively as a component part of a cathode-electrolyte in conjunction with an active metal anode, such as a lithium anode, to produce a good high energy density cell, it has been observed that if the cell is stored for a prolonged period of about three days or longer, passivation of the anode appears to occur which results in undesirable voltage delays at the beginning of discharge along with high cell impedance.

U.S. Pat. No. 3,993,501 to T. Kalnoki-Kis discloses one approach for minimizing or preventing undesirable voltage delays at the beginning of discharge of nonaqueous cells employing an oxyhalide-containing cathode-electrolyte by providing a vinyl polymer film coating on the surface of the anode that contacts the cathode-electrolyte. The disclosure made in this patent is incorporated herein by reference.

U.S. patent application Ser. No. 015,938 now U.S. Pat. No. 4,218,523 discloses a nonaqueous cell comprising an active metal anode, such as lithium, a liquid cathode-electrolyte comprising a solute dissolved in a solvent which is an oxyhalide of an element of Group V or Group VI of the Periodic Table and wherein elemental sulfur or a sulfur compound is incorporated into the cathode-electrolyte so as to substantially eliminate initial voltage delay of the cell during discharge. This disclosure is incorporated herein by reference.

One of the objects of this invention is to substantially prevent the passivation of the active metal anode in liquid cathode-electrolyte cells.

Another object of this invention is to provide a liquid cathode-electrolyte cell wherein the surface of the separator facing the anode is coated with a vinyl polymer film so as to substantially prevent the passivation of the active metal anode during cell storage and usage.

Another object of this invention is to provide an oxyhalide cathode-electrolyte cell system wherein the surface of the separator facing the active metal anode is coated with a thin adherent vinyl polymer film and wherein elemental sulfur or a sulfur compound is employed in the cathode-electrolyte as per the teachings of U.S. application Ser. No. 015,938 so as to effectively prevent the passivation of the active metal anode during cell storage and usage.

The foregoing and additional objects will become more fully apparent from the following description.

SUMMARY OF THE INVENTION

The invention relates to a high energy density nonaqueous cell comprising an active metal anode; a cathode collector; a separator disposed between the anode and the cathode collector; an ionically conductive cathode-electrolyt solution comprising a solute dissolved in an active liquid cathode (depolarizer) with or without a reactive or nonreactive co-solvent; and wherein at least a portion of the surface of the separator, preferably that facing the anode, is coated with a vinyl polymer film so as to lessen the duration of the initial voltage delay of the cell during discharge. Preferably, the vinyl coating on the separator should be employed in the range of between about 0.7 to about 3.5 grams per square meter of projected unifacial area, more preferably between about 1.5 and about 1.8 grams per square meter. An amount below about 0.7 gram per square meter is believed to be ineffective in meaningfully reducing the duration of the voltage delay upon initial discharge while an amount above about 3.5 grams per square meter would cause cracking of the separator and impede electrolyte flow.

The vinyl polymeric materials suitable for use in accordance with this invention are normally solid vinyl polymers such as homopolymers of vinyl or vinylidene chloride, or copolymers containing vinyl chloride or vinylidene chloride having at least one of the following monomers copolymerized therein selected from the group consisting of vinyl esters, dibasic acids, diesters of dibasic acids and monoesters of dibasic acids. The term "copolymers" is used herein to mean mixed polymers or polyblends as well as heteropolymers formed from two or more unlike monomers polymerized together (reference: Concise Chemical and Technical Dictionary, 3rd Edition, H. Bennett, editor, Chemical Publishing Co., 1974).

General examples of suitable copolymers include combinations of vinyl chloride copolymerized with vinyl esters such as vinyl acetate and the like; vinyl chloride copolymerized with diesters of dibasic acids such as dibutyl maleate; vinyl chloride copolymerized with vinyl esters such as vinyl acetate and dibasic acids or mono- or diesters of dibasic acids such as maleic acid, or dibutyl- or monobutyl maleate. Specific examples are: a vinyl chloride-vinyl acetate copolymer containing 97% vinyl chloride—3% vinyl acetate; a vinyl chloride-vinyl acetate copolymer containing 86% vinyl chloride—14% vinyl acetate; a vinyl chloride-vinyl acetate-dibasic acid copolymer containing 86% vinyl chloride—13% vinyl acetate—1% maleic acid.

Suitable vinyl polymeric materials suitable for use in this invention are also disclosed in U.S. Pat. No. 4,141,870 which is incorporated herein by reference.

As used herein and as described in an article titled "Electrochemical Reactions In Batteries" by Akiya Kozawa and R. A. Powers in the Journal of Chemical Education—Vol. 49, pages 587 to 591, September 1972 edition, a cathode depolarizer is the cathode reactant and, therefore, is the material electrochemically reduced at the cathode. The cathode collector is not an active reducible material and functions as a current collector plus electronic conductor to the positive (cathode) terminal of a cell. In other words, the cathode collector is a situs for the electrochemical reduction reaction of the active cathode material and the electronic conductor to the cathode terminal of a cell.

An active liquid reducible cathode material (depolarizer) can either be mixed with a conductive solute which is a nonreactive material but is added to improve conductivity of the liquid active reducible cathode materials, or it can be mixed with both a conductive solute and a reactive or nonreactive co-solvent material. A reactive co-solvent material is one that is electrochemically active and, therefore, functions as an active cathode material which a nonreactive co-solvent material is one that is electrochemically inactive and, therefore, cannot function as an active cathode material.

The separator for use in this invention has to be chemically inert and insoluble in the liquid cathode-electrolyte and have a porosity so as to permit the liquid electrolyte to permeate through and contact the anode of the cell, thus establishing an ion transfer path between the anode and cathode. A suitable separator for use in this invention is nonwoven or woven glass fiber mat.

Any compatible solid which is substantially electronically conductive will be useful as a cathode collector in the cells of the present invention.

It is desirable to have as much surface contact as possible between the cathode-electrolyte and the collector. It is, therefore, preferred to employ a porous collector since it will provide a high surface area interface with the liquid cathode-electrolyte. The collector may be metallic and may be present in any physical form, such as a metallic film, screen or a pressed powder. Preferably, however, a pressed powder collector should be made at least partially of carbonaceous or other high surface area material.

The solute may be a simple or double salt which will produce an ionically conductive solution when dissolved in the solvent. Preferred solutes are complexes of inorganic or organic Lewis acids and inorganic ionizable salts. The main requirements for utility are that the salt, whether simple or complex, be compatible with the solvent being employed and that it yield a solution which is ionically conductive. According to the Lewis or electronic concept of acids and bases, many substances which do not contain active hydrogen can act as acids or acceptors of electron doublets. The basic concept is set forth in the chemical literature (Journal of the Franklin Institute, Vol. 226—July/December, 1938, pages 293–313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

In accordance with the present invention, there is provided a nonaqueous electrochemical system comprising an active metal anode, a cathode collector, a separator disposed between the anode and the cathode collector and having coated on its surface facing the anode a vinyl polymer film, and a cathode-electrolyte, said cathode-electrolyte comprising a solute dissolved in an active reducible electrolyte solvent such as at least one oxyhalide of a Group V or Group VI element of the Periodic Table and/or a halide of a Group IV, V or VI element of the Periodic Table, with or without a co-solvent. The active reducible electrolyte solvent performs the dual function of acting as solvent for the electrolyte salt and as an active cathode of the cell. The term "cathode-electrolyte" is used herein to describe electrolytes containing solvents that can perform this dual function.

The use of a single component of the cell as both an electrolyte solvent and active cathode is a relatively recent development since previously it was generally considered that the two functions were necessarily independent and could not be served by the same material. For an electrolyte solvent to function in a cell, it is necessary that it contact both the anode and the cathode so as to form a continuous ionic path therebetween. Thus it has generally been assumed that the active cathode material must never directly contact the anode and, therefore, it appeared that the two functions were mutually exclusive. However, it has recently been discovered that certain active cathode materials, such as the liquid oxyhalides, do not appreciably react chemically with an active anode metal at the interface between the metal and the cathode material, thereby allowing the cathode material to contact the anode directly and act as the electrolyte carrier. While the theory behind the cause of the inhibition of direct chemical reaction is not fully understood at the present time and the applicant does not desire to be limited to any theory of invention, it appears that direct chemical reaction is inhibited either by an inherently high activation energy of reaction or the formation of a thin, protective film on the anode surface. Any protective film on the anode surface must not be formed to such an excess that a large increase in anode polarization results.

Although the active reducible liquid cathodes, such as the oxyhalides, inhibit the direct reaction of active metal anode surfaces sufficiently to permit them to act as both the cathode material and as the electrolyte carrier for nonaqueous cells, they do cause formation of a surface film on the active metal anode during cell storage particularly at elevated temperatures, which consists of a rather heavy layer of crystalline material. This crystalline layer appears to cause passivation of the anode which results in voltage delay on initial discharge along with high cell impedance values in the range of 11 to 15 ohms for a standard C-size cell.

The extent of anode passivation can be measured by observing the time required for the closed circuit voltage of the stored cell to reach its intended voltage level after discharge has begun. If this delay exceeds 20 seconds, the anode passivation would be considered excessive for most applications. What has been observed, for example, in lithium-oxyhalide cell systems is that after a load is applied across the terminals of the cell, the cell voltage immediately drops below the intended discharge level, then increases at a rate depending on temperature, the thickness of the crystalline layer, and the electrical load.

The exact composition of this layer is not known. The thickness and density of the crystalline layer as well as the size and shape of the crystals were observed to vary with the length of the storage period and also with the temperature during storage, e.g., at low temperatures there is relatively little growth of the crystalline layer as compared to the greater growth of the layer at higher temperatures of about 70° C. It has also been observed that when the oxyhalides, such as thionyl or sulfuryl chloride, are saturated with SO$_2$ and then placed in a lithium anode cell, a crystalline layer rapidly forms on the lithium surface thereby passivating the lithium.

In accordance with the present invention, it has been found that anode passivation can be substantially prevented by having a layer of a vinyl polymer film adhered to at least a portion of the surface of the cell's separator that preferably faces the anode. The vinyl polymer film must adhere to the separator, remain stable in the liquid cathode-electrolyte and not effectively decrease the capacity of the cell during cell storage and discharge. In most cases the presence of the polymer film may even increase the cell capacity on high rate discharge. Although the applicant does not want to be limited to any theory of invention, it appears that one reason why the vinyl polymers, e.g., vinyl chloride polymers, are stable in the oxyhalide cathode-electrolyte cell system, e.g., lithium-oxyhalide cell system, can be explained as follows. One of the accepted mechanisms of vinyl chloride polymer degradation is dehydrochlorination, i.e., the splitting off of a Cl atom and an H atom to form HCl. This process continues until the electronegativity of the remaining Cl atoms on the polymer is compensated for by the energy of conjugation (i.e., double bond formation) in the polymer. Further degradation then is postulated to take place by a free radical mechanism as follows:

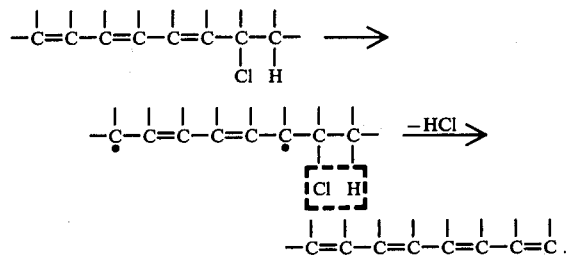

(•indicates free radical)

Most of the compounds which have been observed to interact or interfere with polymer degradation can be explained. By the formation of radicals of the types R•, RO•, ROO• and atomic chlorine. The reaction mechanism by which SO$_2$Cl$_2$ decomposes is assumed to proceed by free radical formation, i.e., Cl• and SO$_2$Cl• as disclosed in an article titled "The Mechanism of the Thermal Decomposition of Sulfuryl Chloride" by Z. G. Szabo and T. Bérces, Zeit. für Physikalische Chemie Neue Folge 12:168–195 (1952). Thus, following the principle of LeChatelier (chemical equilibrium), the stability of vinyl chloride polymers may be enhanced in such an environment as that prevailing in oxyhalide systems. In other words, if the concentration of any of the degradation products is increased, the reaction equilibrium will be shifted in favor of the original undegraded polymer.

Polymers for use in this invention must not be degraded or decomposed in the presence of either the solvent used for the coating procedure or the liquid cathode-electrolyte used in the cell; and must be capable of forming a thin coating which can adhere to the separator.

Although not all the materials in the above group will have the above-identified characteristics, any artisan can easily select those that do by simply testing the material as a coating on a separator surface submerged in a liquid cathode-electrolyte. For example, polyethylene and polypropylene would not be suitable because they would decompose in liquid oxyhalide.

The vinyl polymer film can be applied to the surface of the separator by any conventional technique such as spraying, painting or the like with or without a suitable liquid suspending medium, such as 3-pentanone, methylisobutyl ketone (MIBK), diisobutyl ketone (DIBK) and 2-pentanone. A suitable liquid suspending medium could be the oxyhalide solvents used in the cell, as, for example, thionyl chloride (SOCl$_2$) or sulfuryl chloride (SO$_2$Cl$_2$). Thus, a vinyl polymer such as vinyl chloride-vinyl acetate (86% vinyl chloride and 14% vinyl acetate with a molecular weight ~40,000) can be dissolved in thionyl chloride and then applied to the surface of the separator either by immersing the separator into the solution or by painting or spraying the solution onto the surface of the separator. Upon evaporation of the oxyhalide solvent, an adherent thin film remains on the separator surface. For example, the separator could be easily coated by dipping in a 1% vinyl solution of vinyl acetate/vinyl chloride copolymer in 3-pentanone and then drying the separator at about 200° C. for one minute. This will not only deposit a desired layer of vinyl polymer on the surface of the separator but will also improve the mechanical handling characteristics of the separator material. If desired, a thin layer of a vinyl polymer film could be laminated to the separator provided intimate contact and adhesion to the separator can be obtained.

In the commercial production of cells, it is much easier to coat the surface of the separator rather than the anode and, in addition, the mechanical handling characteristics of the separator are enhanced thus facilitating its assembly into the cell.

The concentration of the vinyl polymer in the liquid medium can vary widely as long as the concentration of the vinyl polymer is deposited on the separator as specified above. In using a separator having a porosity of about 50%, a suitable concentration of the vinyl polymer has been observed to be between about 0.5 to 3.0 weight percent as based on the weight of the liquid suspending medium. A concentration below 0.5 weight percent would probably be insufficient to provide an effective film on the separator while a concentration above 3.0 weight percent would not provide any meaningful additional protection against the metal anode passivation and may possibly result in damage to the separator during handling.

The effective range of concentration of vinyl polymer can vary between about 0.7 and about 3.5 grams per square meter of apparent unifacial area and preferably between about 1.5 and about 1.8 grams per square meter. A concentration below about 0.7 gram per square meter would be ineffective in substantially preventing the passivation of the active metal anode, such as lithium, while a concentration above about 3.5 grams per square meter would undesirably increase the internal resistance of the cell.

Suitable oxyhalides for use in this invention include sulfuryl chloride, thionyl chloride, phosphorus oxychloride, thionyl bromide, chromyl chloride, vanadyl tribromide and selenium oxychloride.

Useful organic co-solvents for use in this invention include the following classes of compounds:
Trialkyl borates: e.g., trimethyl borate, (CH$_3$O)$_3$B (liquid range −29.3° to 67° C.)
Tetraalkyl silicates: e.g., tetramethyl silicate, (CH$_3$O)$_4$Si (boiling point 121° C.)
Nitroalkanes: e.g., nitromethane, CH$_3$NO$_2$ (liquid range −17° to 100.8° C.)
Alkylnitriles: e.g., acetonitrile, CH$_3$CN (liquid range −45° to 81.6° C.)
Dialkylamides: e.g., dimethylformamide, HCON(CH$_3$)$_2$ (liquid range −60.48° to 149° C.)
Lactams: e.g., N-methylpyrrolidone,

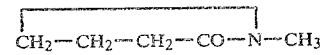

(liquid range −16° to 202° C.)
Tetraalkylureas: e.g., tetramethylurea, (CH$_3$)$_2$N—CO—N(CH$_3$)$_2$ (liquid range −1.2° to 166° C.)
Monocarboxylic acid esters: e.g., ethyl acetate (liquid range −83.6° to 77.06° C.)
Orthoesters: e.g., trimethylorthoformate, HC(OCH$_3$)$_3$ (boiling point 103° C.)
Lactones: e.g., γ-(gamm)butyrolactone,

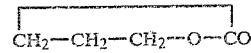

(liquid range −42° to 206° C.)
Dialkyl carbonates: e.g., dimethyl carbonate, OC(OCH$_3$)$_2$ (liquid range 2° to 90° C.)
Alkylene carbonates: e.g., propylene carbonate,

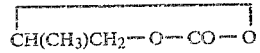

(liquid range −48° to 242° C.)
Monoethers: e.g., diethyl ether (liquid range −116° to 34.5° C.)
Polyethers: e.g., 1,1- and 1,2-dimethoxyethane (liquid ranges −113.2° to 64.5° C. and −58° to 83° C., respectively)
Cyclic ethers: e.g., tetrahydrofuran (liquid range −65° to 67° C.); 1,3-dioxolane (liquid range −95° to 78° C.)
Nitroaromatics: e.g., nitrobenzene (liquid range 5.7° to 210.8° C.)
Aromatic carboxylic acid halides: e.g., benzoyl chloride (liquid range 0° to 197° C.); benzoyl bromide (liquid range −24° to 218° C.)
Aromatic sulfonic acid halides: e.g., benzene sulfonyl chloride (liquid range 14.5° to 251° C.)
Aromatic phosphonic acid dihalides: e.g., benzene phosphonyl dichloride (boiling point 258° C.)
Aromatic thiophosphonic acid dihalides: e.g., benzene thiophosphonyl dichloride (boiling point 124° C. at 5 mm.)
Cyclic sulfones: e.g., sulfolane,

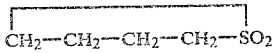

(melting point 22° C.); 3-methylsulfolane (melting point −1° C.)
Alkyl sulfonic acid halides: e.g., methanesulfonyl chloride (boiling point 161° C.)
Alkyl carboxylic acid halides: e.g., acetyl chloride (liquid range −112° to 50.9° C.); acetyl bromide (liquid range −96° to 76° C.); propionyl chloride (liquid range −94° to 80° C.)

Saturated heterocyclics: e.g., tetrahydrothiophene (liquid range −96° to 121° C.); 3-methyl-2-oxazolidone (melting point 15.9° C.)

Dialkyl sulfamic acid halides: e.g., dimethyl sulfamyl chloride (boiling point 80° C., 16 mm.)

Alkyl halosulfonates: e.g., ethyl chlorosulfonate (boiling point 151° C.)

Unsaturated heterocyclic carboxylic acid halides: e.g., 2-furoyl chloride (liquid range −2° to 173° C.)

Five-membered unsaturated heterocyclics: e.g., 3,5-dimethylisoxazole (boiling point 140° C.); 1-methylpyrrole (boiling point 114° C.); 2,4-dimethylthiazole (boiling point 144° C.); furan (liquid range −85.65° to 31.36° C.)

Esters and/or halides of dibasic carboxylic acids: e.g., ethyl oxalyl chloride (boiling point 135° C.)

Mixed alkyl sulfonic acid halides and carboxylic acid halides: e.g., chlorosulfonyl acetyl chloride (boiling point 98° C. at 10 mm.)

Dialkyl sulfoxides: e.g., dimethyl sulfoxide (liquid range 18.4° to 189° C.)

Dialkyl sulfates: e.g., dimethylsulfate (liquid range −31.75° to 188.5° C.)

Dialkyl sulfites: e.g., dimethylsulfite (boiling point 126° C.)

Alkylene sulfites: e.g., ethylene glycol sulfite (liquid range −11° to 173° C.)

Halogenated alkanes: e.g., methylene chloride (liquid range −95° to 40° C.); 1,3-dichloropropane (liquid range −99.5° to 120.4° C.).

Of the above, the preferred co-solvents are nitrobenzene; tetrahydrofuran; 1,3-dioxolane; 3-methyl-2-oxazolidone; propylene carbonate; γ-butyrolactone; sulfolane; ethylene glycol sulfite; dimethyl sulfite and benzoyl chloride. Of the preferred co-solvents, the best are nitrobenzene; 3-methyl-2-oxazolidone; benzoyl chloride; dimethyl sulfite and ethylene glycol sulfite because they are more chemically inert to battery components and have long liquid ranges, and especially because they permit highly efficient utilization of the cathode materials.

It is also within this invention to employ inorganic solvents such as liquid inorganic halides of elements from Groups IV, V and VI of the Periodic Table, e.g., selenium tetrafluoride ($SeF_4$), selenium monobromide ($Se_2Br_2$), thiophosphoryl chloride ($PSCl_3$), thiophosphoryl bromide ($PSBr_3$), vanadium pentafluoride ($VF_5$), lead tetrachloride ($PbCl_4$), titanium tetrachloride ($TiCl_4$), disulfur decafluoride ($S_2F_{10}$), tin bromide trichloride ($SnBrCl_3$), tin dibromide dichloride ($SnBr_2Cl_2$), tin tribromide chloride ($SnBr_3Cl$), sulfur monochloride ($S_2Cl_2$) and sulfur dichloride ($SCl_2$). These halides, in addition to functioning as an electrolyte solvent in nonaqueous cells, can also function as an active reducible cathode thereby contributing to the overall active reducible material in such cells.

Useful anode materials are generally consumable metals and include aluminum, the alkali metals, alkaline earth metals and alloys of alkali metals or alkaline earth metals with each other and other metals. The term "alloy" as used herein and in the appended claims is intended to include mixtures, solid solutions such as lithium-magnesium, and intermetallic compounds such as lithium monoaluminide. The preferred anode materials are the alkali metals such as lithium, sodium and potassium, and alkaline earth metals such as calcium.

In the preferred embodiment, in selecting the particular oxyhalide for a particular cell in accordance with this invention one should also consider the stability of the particular oxyhalide in the presence of the other cell components and operating temperatures at which the cell is expected to perform. Thus an oxyhalide should be selected that will be stable in the presence of the other cell components.

In addition, if it is desired to render the electrolyte solution more viscous or convert it into a gel, a gelling agent such as colloidal silica may be added.

The following examples are illustrative of the present invention and are not intended to any manner to be limitative thereof.

EXAMPLE 1

Three lots of 0.475 inch diameter cells were prepared employing the following components:

0.45 gram of lithium;

a cathode collector made from 0.65 gram of a mixture of 90 weight percent carbon black and 10 weight percent Teflon* binder;

*Trademark for polytetrafluoroethylene.

a felted nonwoven glass fiber separator (Type 934S made by the Mead Co.) in contact with the cathode collector; and 2.4 cc of a liquid cathode-electrolyte solution of 1 molar $LiAlCl_4$ in $SOCl_2$ and containing lithium sulfide added up to its saturation point in the solution.

The components were assembled into stainless steel containers which are sealed with covers in a conventional manner.

The above cells were stored under various conditions, then discharged on a 75-ohm load. The average discharge voltage after one second for three cells in each lot is shown in Table I.

TABLE I

| Cell Lot | Storage Conditions | | | |
|---|---|---|---|---|
| | Fresh | 1 WK at 71° C. | 1 MO at 20° C. | 3 MO at 20° C. |
| 1 | 3.18V | 2.50V | 1.76V | 1.38V |
| 2 | 3.40V | 1.08V | 1.82V | 0.96V |
| 3 | 2.88V | 1.27V | 1.52V | 1.07V |

V = volts
WK = week
MO = month

Three additional cell lots were prepared as above except the separators, before being assembled in the cell, were dipped into a 1 weight percent vinyl acetate/vinyl chloride copolymer in 3-pentanone and then quickly dried by heating at about 200° C. for one minute. The vinyl acetate/vinyl chloride was obtained commercially from Union Carbide Corporation as VYHN consisting of 86 wt. % vinyl chloride and 14 wt. % vinyl acetate. The separators with the vinyl polymer coating were mechanically easier to handle and assemble into the cells. The three cell lots were stored under various conditions and then discharged on a 75-ohm load. The average voltage observed for three cells in each lot after one second is shown in Table II.

TABLE II

| Cell Lot | Storage Conditions | | | |
|---|---|---|---|---|
| | Fresh | 1 WK at 71° C. | 1 MO at 20° C. | 3 MO at 20° C. |
| 4 | 3.21V | 1.50V | 2.18V | 1.53V |
| 5 | 3.39V | 1.50V | 2.00V | 1.87V |
| 6 | 3.01V | 1.25V | 1.96V | 1.72V |

As evident from the above data, the cells having the vinyl polymer-coated separators showed a larger average voltage reading after storage for one month and three months than the cells using the uncoated separators.

The six cell lots were then continuously discharged across a 75-ohm load after storage under various conditions and the average ampere-hours (AH) calculated for three cells in each lot are shown in Table III.

TABLE III

| Cell | Storage Conditions | | |
|---|---|---|---|
| Lot | 1 WK at 71° C. | 1 MO at 20° C. | 3 MO at 20° C. |
| 1 | 0.48AH | 0.57AH | 0.51AH |
| 2 | 0.49AH | 0.65AH | 0.56AH |
| 3 | 0.52AH | 0.57AH | 0.59AH |
| 4 | 0.62AH | 0.63AH | 0.63AH |
| 5 | 0.55AH | 0.57AH | 0.63AH |
| 6 | 0.72AH | 0.59AH | 0.61AH |

EXAMPLE 2

A number of additional cells were constructed as in Example 1 except that the solution used to coat the separators varied from 0.5 to 3% by weight vinyl acetate/vinyl chloride copolymer (VYHH) in 3-pentanone as shown in Table IV. Three cells of each type, including three cells in which the separator was not coated, were stored under various conditions and then discharged on a 75-ohm load. The average voltage after one second and the average ampere-hours delivered are shown in Table IV.

TABLE IV

| Storage Conditions | No VYHH (Control Cell) | ½% VYHH | 1% VYHH | 1½% VYHH | 2% VYHH | 3% VYHH |
|---|---|---|---|---|---|---|
| Fresh | 3.18V | 3.20V | 3.17V | 3.19V | 3.43V | 3.44V |
| 1 WK at 71° C. | 2.50V | 1.98V | 2.17V | 2.33V | 1.65V | 1.83V |
|  | 0.48AH | 0.42AH | 0.41AH | 0.42AH | 0.61AH | 0.60AH |
| 1 MO at 20° C. | 1.76V | 1.86V | 2.05V | 2.02V | 1.95V | 1.99V |
|  | 0.57AH | 0.65AH | 0.59AH | 0.54AH | 0.63AH | 0.62AH |
| 3 MO at 20° C. | 1.38V | 1.32V | 1.48V | 1.41V | 1.99V | 1.71V |
|  | 0.51AH | 0.57AH | 0.48AH | 0.59AH | 0.61AH | 0.63AH |

The amount of vinyl retained on the separator after coating with the various vinyl solutions ranges from about 0.7 to 1.0 g/m$^2$ of separator material for the 0.5 weight percent vinyl/solvent solution up to about 3.5 g/m$^2$ of separator material for the 3 weight percent vinyl/solvent solution. Based on the separator weight (about 25 g/m$^2$), this would produce from about 2.8 weight percent to about 14 weight percent vinyl from the 0.5 percent to 3 percent range of coated solution used, respectively.

EXAMPLE 3

A number of additional cells were constructed as in Example 1 with some of the separators coated with a 1 weight percent vinyl acetate/vinyl chloride copolymer in 3-pentanone. In addition, the lithium electrodes in some cells were replaced with lithium-aluminum alloy electrodes, each weighing 0.52 gram and consisting of 85 weight percent lithium and 15 weight percent aluminum. Three of each type of the various cells were stored under various conditions and then discharged on a 75-ohm load. The average voltages after one second and the average ampere-hours delivered are shown in Table V.

TABLE V

| Storage Conditions | Lithium Electrode | | Lithium-Aluminum Alloy Electrode | |
|---|---|---|---|---|
|  | 1% VYHH | No Vinyl | 1% VYHH | No Vinyl |
| Fresh | 3.33V | 3.40V | 3.33V | 3.33V |
| 1 WK at 71° C. | 1.50V | 1.08V | 1.83V | 0.98V |
|  | 0.63AH* | 0.49AH | 0.42AH | 0.45AH |
| 1 MO at 20° C. | 2.14V | 1.82V | 1.62V | 1.20V |
|  | 0.64AH | 0.65AH | 0.62AH |  |
|  |  | 0.60AH |  |  |
| 3 MO at 20° C. | 1.48V | 0.96V | 0.98V | 0.63V |
|  | 0.58AH | 0.56AH | 0.53AH | 0.48AH |

*only one cell

EXAMPLE 4

Additional cells were constructed as in Example 1 except that in each cell either 0.479 gram of a lithium foil or 0.450 gram of extruded lithium was used as the anode; the cathode collector consisted of 85 weight percent carbon black and 15 weight percent Teflon; the cathode-electrolyte solution consisted of 2.4 cc of 1 molar LiAlCl$_4$ in SO$_2$Cl$_2$ and containing lithium sulfide added up to the saturation point of the solution; and the separator was coated from a vinyl solution as shown in Table VI. The cells were stored under various conditions and then discharged on a 75-ohm load. The average voltages of three cells observed after one second and the average amphere-hours delivered are shown in Table VI. In cell lot 8, the separators after being dipped into the solution were dried at room temperature for 2 hours. In cell lot 9, the separators were dried for one minute at 175° C. while in cell lot 10 the separators were dried at 225° C. for one minute.

TABLE VI

| Cell Lot (3 cells) | Anodes | Coating Solution | 1 second voltage (volts) | | | | Amp hours | | |
|---|---|---|---|---|---|---|---|---|---|
|  |  |  | Fresh | 1 wk at 71° | 1 Mo at 20° | 3 Mo at 20° C. | 1 Wk at 71° | 1 Mo at 20° C. | 3 Mo at 20° C. |
| 1 | Foil | 1% VYHH . SOCl$_2$ | 3.23 | 2.38 | 2.86 |  | 1.13 | 1.12 |  |
| 2 | Foil | 1% VYNW* . SOCl$_2$ | 3.26 | 3.00 | 2.58 |  | 0.81 | 0.92 |  |
| 3 | Foil | 1% VYHH . DIBK** | 3.16 | 2.80 | 2.76 |  | 0.99 | 1.14 |  |
| 4 | Extruded | 1% VYHH . DIBK | 3.03 | 2.99 | 3.05 |  | 1.06 | 1.13 |  |
| 5 | Extruded | ½% VYHH . DIBK | 3.38 | 2.87 | 3.23 |  | 1.05 | 1.10 |  |
| 6 | Extruded | 1½% VYHH . DIBK | 3.29 | 2.17 | 2.42 |  | 1.13 | 1.10 |  |
| 7 | Extruded | ½% VYHH . DIBK | 3.03 | 2.51 | 2.49 |  |  |  |  |
| 8 | Extruded | 1% VYHH . DIBK | 3.23 | 2.30 | 2.77 | 2.60 | 1.21 | 1.02 | 1.12 |

TABLE VI-continued

| Cell Lot (3 cells) | Anodes | Coating Solution | Fresh | 1 second voltage (volts) 1 wk at 71° | 1 Mo at 20° | 3 Mo at 20° C. | Amp hours 1 Wk at 71° | 1 Mo at 20° C. | 3 Mo at 20° C. (2 cells) |
|---|---|---|---|---|---|---|---|---|---|
| 9 | Extruded | 1% VYHH . DIBK | 3.31 | 2.67 | 3.16 | 2.49 | 1.22 | 1.31 | 1.09 |
| 10 | Extruded | 1% VYHH . DIBK | 3.32 | 2.67 | 3.09 | 2.61 | 1.15 | 1.25 | 1.15 |
| 11 | Extruded | 1% VYHH . 3 Pentanone | 3.41 | 2.59 | 2.68 | | 1.08 | | |
| 12 | Extruded | 1% VYHH . DIBK | 3.43 | 2.10 | 2.92 | | 1.21 | | |
| 13 | Extruded | 1% VYHH in 2 Pentanone | 2.91 | 2.75 | 2.63 | | 1.07 | | |

*VYNW is a vinyl acetate/vinyl chloride copolymer containing 97 wt % vinyl chloride and 3 wt % vinyl acetate
**DIBK is diisobutyl ketone While the present invention has been described with reference to many particular details thereof, it is not intended that these details should be construed as limiting the scope of the invention.

What is claimed is:

1. A nonaqueous cell comprising an ionically conductive cathode-electrolyte solution comprising a solute dissolved in an active liquid cathode; an active metal anode; a cathode collector; a separator disposed between the anode and the cathode collector; and wherein at least a portion of the surface of the separator is coated with a vinyl polymer film.

2. The nonaqueous cell of claim 1 wherein the vinyl polymer is selected from the group consisting of homopolymers of vinyl or vinylidene chloride, and copolymers containing vinyl chloride or vinylidene chloride having at least one monomer copolymerized therein selected from the group consisting of vinyl esters, dibasic acids, diesters of dibasic acids and monoesters of dibasic acids.

3. The nonaqueous cell of claim 1 wherein the vinyl polymer is selected from the group consisting of vinyl chloride-vinyl acetate copolymers, vinyl chloride-vinyl acetate-dibasic acid copolymers and vinyl chloride homopolymers.

4. The nonaqueous cell of claim 1, 2 or 3 wherein the amount of the vinyl polymer film on the separator ranges from about 0.7 to about 3.5 grams per square meter of projected unifacial area.

5. The nonaqueous cell of claim 1, 2 or 3 wherein the amount of the vinyl polymer film on the separator ranges from about 1.5 to 1.8 grams per square meter of projected unifacial area.

6. The nonaqueous cell of claim 1, 2 or 3 wherein the cathode electrolyte contains a material selected from the the group consisting of lithium sulfide and sulfur monochloride and mixtures thereof.

7. The nonaqueous cell of claim 1, 2 or 3 wherein cathode-electrolyte contains at least one liquid oxyhalide selected from the group consisting of thionyl chloride, sulfuryl chloride, phosphorous oxychloride, thionyl bromide, chromyl chloride, vanadyl tribromide and selenium oxychloride.

8. The nonaqueous cell of claim 7 wherein the at least one liquid oxyhalide is selected from the group consisting of thionyl chloride and sulfuryl chloride.

9. The nonaqueous cell of claim 7 wherein the cathode-electrolyte contains an inorganic cosolvent.

10. The nonaqueous cell of claim 7 wherein the cathode-electrolyte contains an organic cosolvent.

11. The nonaqueous cell of claim 7 wherein the anode is lithium and the liquid oxyhalide is thionyl chloride.

12. The nonaqueous cell of claim 7 wherein the anode is lithium and the liquid oxyhalide is sulfuryl chloride.

13. The nonaqueous cell of claim 1, 2 or 3 wherein the anode is selected from the group consisting of lithium, sodium, calcium, potassium and aluminum.

14. The nonaqueous cell of claim 1, 2 or 3 wherein solute is a complex salt of a Lewis acid and an inorganic ionizable salt.

* * * * *